United States Patent
Kuksenkov (10) Patent No.: US 10,067,386 B2
(45) Date of Patent: Sep. 4, 2018

(54) DEVICES COMPRISING CONVEX COLOR CONVERTING ELEMENTS

(71) Applicant: CORNING INCORPORATED, Corning, NY (US)

(72) Inventor: Dmitri Vladislavovich Kuksenkov, Elmira, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/515,684

(22) PCT Filed: Sep. 30, 2015

(86) PCT No.: PCT/US2015/053072
§ 371 (c)(1),
(2) Date: Mar. 30, 2017

(87) PCT Pub. No.: WO2016/054127
PCT Pub. Date: Apr. 7, 2016

(65) Prior Publication Data
US 2017/0299923 A1  Oct. 19, 2017

Related U.S. Application Data (60) Provisional application No. 62/057,396, filed on Sep. 30, 2014.

(51) Int. Cl.
*G02F 1/1335* (2006.01)
*G02B 3/00* (2006.01)
(Continued)

(52) U.S. Cl.
CPC ..... *G02F 1/133617* (2013.01); *G02B 3/0056* (2013.01); *G02B 3/02* (2013.01);
(Continued)

(58) Field of Classification Search
None
See application file for complete search history.

(56) References Cited

U.S. PATENT DOCUMENTS

| 4,483,700 A | 11/1984 | Forker, Jr. et al. |
| 5,608,554 A | 3/1997 | Do et al. |

(Continued)

FOREIGN PATENT DOCUMENTS

| JP | 2012043902 A | 3/2012 |
| WO | 2013158038 A1 | 10/2013 |

OTHER PUBLICATIONS

Chen et al. "Self-aligned hemispherical formation of microlenses from colloidal droplets on heterogeneous surfaces", J. Micromech. Microeng., v. 19, p. 025002, 2009.
(Continued)

*Primary Examiner* — Ashok Patel
(74) *Attorney, Agent, or Firm* — Ryan T. Hardee (57) ABSTRACT

Disclosed herein are light-emitting devices comprising a glass substrate having a first surface, and a plurality of color-converting elements disposed on the first surface, wherein at least one of the plurality of color-converting elements comprises a convex surface. Also disclosed herein are display devices comprising such light-emitting devices and methods for making the light-emitting devices.

17 Claims, 5 Drawing Sheets

(51) Int. Cl.
*G02B 3/02* (2006.01)
*G02B 5/20* (2006.01)

(52) U.S. Cl.
CPC ....... *G02B 5/201* (2013.01); *G02F 1/133514* (2013.01); *G02F 2001/133614* (2013.01)

(56) References Cited

U.S. PATENT DOCUMENTS

| | | |
|---|---|---|
| 5,674,790 A | 10/1997 | Araujo |
| 6,218,774 B1 | 4/2001 | Pope |
| 6,645,079 B2 | 11/2003 | Yoshimura |
| 6,768,525 B2 | 7/2004 | Paolini et al. |
| 6,844,903 B2 | 1/2005 | Mueller-Mach et al. |
| 7,248,310 B2 | 7/2007 | Mueller-Mach et al. |
| 7,666,511 B2 | 2/2010 | Ellison et al. |
| 7,746,423 B2 | 6/2010 | Im et al. |
| 7,928,458 B2 * | 4/2011 | Lin ................ H01L 33/507 257/98 |
| 7,982,812 B2 | 7/2011 | Rho et al. |
| 8,514,352 B2 | 8/2013 | Montgomery et al. |
| 2008/0186576 A1 | 8/2008 | Takada |
| 2010/0208328 A1 | 8/2010 | Heikenfeld et al. |
| 2012/0188772 A1 * | 7/2012 | Sakai ................ H01L 33/46 362/296.01 |
| 2012/0218174 A1 | 8/2012 | Kim et al. |
| 2013/0126926 A1 * | 5/2013 | Sakai ................ H01L 33/005 257/98 |
| 2013/0270587 A1 | 10/2013 | Ouderkirk et al. |
| 2014/0091275 A1 | 4/2014 | Coe-Sullivan et al. |
| 2014/0291611 A1 * | 10/2014 | Tseng ................ H01L 33/505 257/13 |
| 2016/0013374 A1 * | 1/2016 | Dijken ................ H01L 33/486 257/98 |

OTHER PUBLICATIONS

Jun et al. "Highly luminescent and photostable quantum dot-silica monolith and its application to light-emitting diodes", ACS Nano, v.7, No. 2, pp. 1472-1477, 2013.

Lim et al. "Perspective on synthesis, device structures, and printing processes for quantum dot displays", Opt. Mater. Express, v.2, No. 5, pp. 594-628, 2012.

Schift et al. "Nanoimprint lithography—patterning of resists using molding" Emerging Nanopatterning Methods pp. 272-273, accessed Nov. 30, 2015.

Vecht et al. "Narrow band 390 nm emitting phosphors for photoluminescent liquid crystal displays", Journ. of Appl. Phys., v. 84, No. 7, pp. 3827-3829, 1998.

* cited by examiner

DEVICES COMPRISING CONVEX COLOR CONVERTING ELEMENTS

CROSS-REFERENCE TO RELATED APPLICATIONS

This application claims the benefit of priority under 35 U.S.C. § 371 of International Patent Application Serial No. PCT/US15/53072, filed on Sep. 30, 2015, which in turn, claims the benefit of priority of U.S. Provisional Patent Application Ser. No. 62/057396 filed on Sep. 30, 2014, the contents of each of which are relied upon and incorporated herein by reference in their entireties.

FIELD OF THE DISCLOSURE

The disclosure relates generally to devices comprising color-converting elements and displays comprising such devices, and more particularly to light-emitting devices comprising color-converting elements having a convex outer surface and liquid crystal display devices comprising the same.

BACKGROUND

Liquid crystal displays (LCDs) are commonly used in various electronics, such as cell phones, laptops, electronic tablets, televisions, and computer monitors. However, conventional LCDs can be limited, as compared to other display devices, in terms of brightness, contrast ratio, efficiency, and/or viewing angle. For instance, to compete with organic light emitting diode (OLED) technology, there is a demand for higher contrast ratio, color gamut, and brightness in conventional LCDs while also balancing product cost and power requirements, e.g., in the case of handheld devices.

The display properties of LCDs can be limited by various key components of the LCD panel, e.g., the backlight and the color filter. For example, conventional LCDs can comprise a backlight utilizing white light emitting diodes (LEDs) and patterned transmissive color filters to define red, green, and blue pixels. Blue light emitted by LEDs can be converted to white light, which can then be transmitted through two polarizers and an LCD stack, and subsequently filtered through a color filter element. During this conversion/filtering process, a large portion of the light produced by the LED can be lost such that as little as 10% of the light generated by the backlight can be emitted by the display. Moreover, the power efficiency of such LCD devices can be very low, with an overall electrical to optical power efficiency of less than about 1%. Finally, the color gamut of the LCDs can be limited, for example, the color gamut can be as low as 70% of the standard set by the National Television System Committee (NTSC), due to non-optimal spectral content of white LEDs in combination with reduced transmission of the color filter element.

Recent advances in LCD technology suggest that the efficiency and color gamut of LCDs can be improved by using emissive (e.g., photoluminescent) color filters instead of transmissive color filters. For example, cold cathode fluorescent lamps (CCFLs) have been used in combination with red, green, and blue phosphor materials, which can be placed as desired in the respective pixel areas of a photoluminescent color filter. Blue LED backlights are also available, in which case red and green phosphors can be used, and the areas of the color filter corresponding to blue pixels could be left transparent, or provided with light scattering features.

Quantum dots (QDs) have also emerged as an alternative to conventional phosphors and can, in some instances, provide improved precision and/or narrower emission lines, which can improve, e.g., the LCD color gamut. In addition to high internal quantum efficiency and low quantum defect (the wavelength difference between excitation and emission light), QD materials can provide relatively high color purity, e.g., they can emit light in a relatively narrow spectral band as compared to conventional phosphors, and the central wavelength of that band can be tuned relatively easily by changing the size of the individual QDs. However, devices patterned with QDs can be expensive and/or complex to produce.

Traditional color filters can be produced using separate steps for the red, green, and blue pixel areas, each step comprising depositing the corresponding phosphor in the corresponding pixel area. For example, a continuous layer of material can be deposited and then patterned using photolithography, lift-off or etching, or can be deposited through a photolithographically defined shadow mask. This technology can, however, be complex and expensive, and may not be easily adaptable to QD materials. QD materials, for example, can be too heavy to be deposited by thermal evaporation and, thus, have instead been deposited using dip-coating or slot-coating. Newly developed processes include micro-contact printing and inkjet printing, but these processes are not free of their own challenges. Micro-contact printing can result in material waste and may be difficult to scale up. Inkjet printing, on the other hand, may present challenges in terms of developing suitable solution chemistry for precise pixel definition and/or preserving photoluminescent efficiency after drying. Further, regardless of the particular deposition process, QD films can also have reduced light extraction efficiency, e.g., for a flat surface, less than about 20% of the light generated by the QDs can be emitted by the film due to total internal reflection (TIR).

Accordingly, it would be advantageous to provide light-emitting devices, e.g., for LCDs, which can exhibit improved power and optical efficiency, while also reducing material waste, thereby lowering the cost of such devices, and/or simplifying the manufacturing process, thereby reducing production time.

SUMMARY

The disclosure relates, in various embodiments, to light-emitting devices comprising a glass substrate having a first surface, and a plurality of color-converting elements disposed on the first surface of the glass substrate, wherein at least one of the plurality of color-converting elements comprises a convex surface. Display devices comprising such light-emitting devices are also disclosed herein. The disclosure further relates to methods for making light-emitting devices, the methods comprising depositing on a first surface of a glass substrate a mixture comprising at least one color converter and at least one additional component, and curing or drying the mixture to produce at least one color-converting element having a convex surface.

According to various embodiments, the first surface of the glass substrate can be patterned with a hydrophobic material. The first surface of the glass substrate can, in other embodiments, be etched, masked, and/or coated to form a pattern of grooves and/or concave indentations. In certain embodiments, the mixture comprising the color converters can be deposited as discrete droplets on the portions of the first surface not coated with a hydrophobic material, between grooves, and/or in the concave indentations present in or on the first surface to form a plurality of color-converting elements, at least one of which comprises a convex surface. According to further embodiments, the at least one additional component can be a polymeric material or solvent, for example, the mixture can be a solution. In still further embodiments, the color-converting elements may be chosen from red, green, blue and/or white light-emitting quantum dots and phosphors, fluorescent materials, fluorescent dyes, and/or light-emitting polymers.

Additional features and advantages of the disclosure will be set forth in the detailed description which follows, and in part will be readily apparent to those skilled in the art from that description or recognized by practicing the methods as described herein, including the detailed description which follows, the claims, as well as the appended drawings.

It is to be understood that both the foregoing general description and the following detailed description present various embodiments of the disclosure, and are intended to provide an overview or framework for understanding the nature and character of the claims. The accompanying drawings are included to provide a further understanding of the disclosure, and are incorporated into and constitute a part of this specification. The drawings illustrate various embodiments of the disclosure and together with the description serve to explain the principles and operations of the disclosure.

BRIEF DESCRIPTION OF THE DRAWINGS

The following detailed description can be further understood when read in conjunction with the following drawings.

DETAILED DESCRIPTION

Devices

Disclosed herein are light-emitting devices comprising a glass substrate having a first surface, and a plurality of color-converting elements disposed on the first surface of the glass substrate, wherein at least one of the plurality of color-converting elements comprises a convex surface. Display devices comprising such light-emitting devices are also disclosed herein.

As used herein, the term "color-converting element" and variations thereof is intended to denote the features disposed on the first surface of the glass substrate having a convex surface. The color-converting element can comprise, e.g., encapsulate, at least one color converter emitting red, green, blue, or white light, e.g., quantum dots, phosphors, fluorescent materials, fluorescent dyes, and light-emitting polymers. The color-converting element may be formed by, e.g., depositing a mixture of color converters dispersed in at least one additional component and subsequently removing the additional component and/or hardening the mixture to form a color-converting element having a convex surface.

Figure 1A:
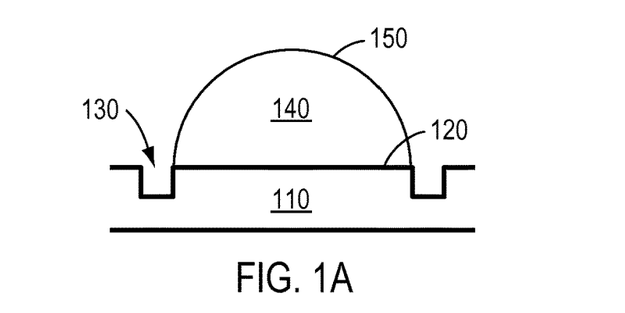
FIGS. 1A-C illustrate side views of portions of a light-emitting device according to embodiments of the present disclosure.
Figure 1B:
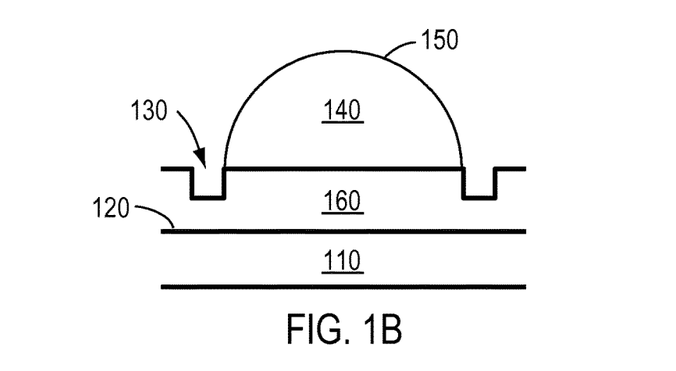
Figure 1C:
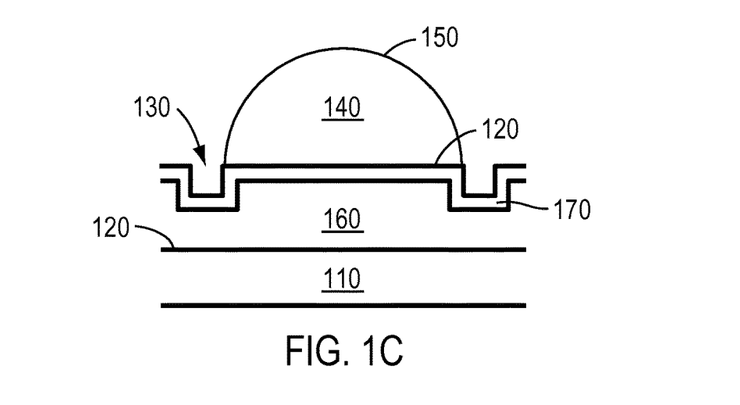

FIGS. 1A-C and 2A-C depict side views of portions of light-emitting devices according to various non-limiting embodiments of the instant disclosure. The individual components of the devices are discussed in more detail below. In FIG. 1A, a light-emitting device comprising a glass substrate 110 is illustrated, the glass substrate having a first surface 120. In certain embodiments, the first surface 120 can comprise one or more grooves 130. At least one color-converting element 140 having a convex surface 150 can be disposed on the first surface 120 of the glass substrate 110. In another embodiment, as illustrated in FIG. 1B, the first surface 120 of the glass substrate 110 can be coated with a moldable material 160 comprising at least one groove 130 and the color-converting element 140 can be disposed on the first surface of the glass substrate thus modified. In a further embodiment, as illustrated in FIG. 1C, a blue dichroic filter 170 can also optionally be included in the device, e.g., in addition to the moldable material 160 (as shown) or layered on the glass substrate itself (not depicted).

Figure 2A:
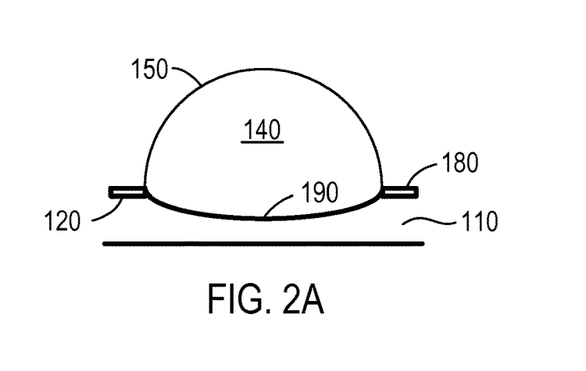
FIGS. 2A-C illustrate side views of portions of a light-emitting device according to additional embodiments of the disclosure.
Figure 2B:
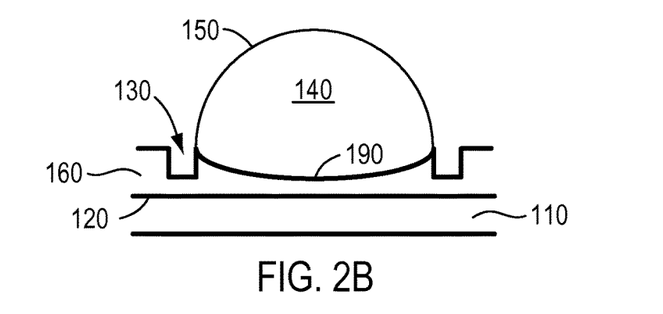
Figure 2C:
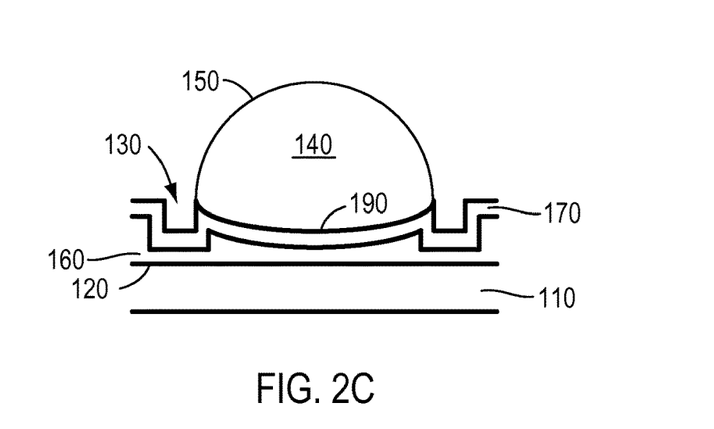

FIG. 2A depicts an additional non-limiting embodiment in which the first surface 120 of the glass substrate 110 can be patterned with a hydrophobic material 180 to create various "openings" in which the color-converting element can be disposed or located. The color-converting element 140 can thus be disposed on a portion of the first surface 120 of the glass substrate 110 not coated with the hydrophobic material 180. The first surface 120 is illustrated in FIG. 2A as comprising a concave indentation 190 in which the color-converting element 140 is located; however, it is to be understood that a substantially planar first surface 120 can also be patterned with the hydrophobic material 180. According to the embodiment depicted in FIG. 2B, the first surface 120 of the glass substrate 110 can be coated with a moldable material 160 comprising at least one groove 130. Again, the moldable material can comprise a concave indentation 190 as illustrated or can be substantially planar (see, e.g., FIG. 1B). Finally, as depicted in FIG. 2C, a blue dichroic layer 170 can optionally be included in the device, e.g., in addition to the moldable material 160 (as shown) or layered on the glass substrate itself (not depicted), and a concave indentation 190 in the dichroic filter layer 170 (or moldable material or glass sheet) may or may not be present. It is to be understood that the various embodiments depicted in FIGS. 1A-C and 2A-C should not limit the scope of the appended claims and can be combined with each other or otherwise modified as set forth throughout the disclosure without limitation.

The glass substrate 100 may comprise any glass known in the art for use in a backlit display, such as an LCD, including, but not limited to, soda-lime silicate, aluminosilicate, alkali-aluminosilicate, borosilicate, alkali-borosilicate, aluminoborosilicate, alkali-aluminoborosilicate, and other suitable glasses. The glass substrate may, in various embodiments, be chemically strengthened and/or thermally tempered. Non-limiting examples of suitable commercially available substrates include EAGLE XG®, Lotus™, Willow®, and Gorilla® glasses from Corning Incorporated, to name a few. Such chemically strengthened glass, for example, may be provided in accordance with U.S. Pat. Nos. 7,666,511, 4,483,700, and 5,674,790, which are incorporated herein by reference in their entireties.

Chemical strengthening of glass can be carried out, e.g., by ion exchange. During the ion exchange process, ions within a glass sheet at or near the surface of the glass sheet may be exchanged for larger metal ions, for example, from a salt bath. The incorporation of the larger ions into the glass can strengthen the sheet by creating a compressive stress in a near surface region. A corresponding tensile stress can be induced within a central region of the glass sheet to balance the compressive stress.

Ion exchange may be carried out, for example, by immersing the glass in a molten salt bath for a predetermined period of time. Exemplary salt baths include, but are not limited to, $KNO_3$, $LiNO_3$, $NaNO_3$, $RbNO_3$, and combinations thereof. The temperature of the molten salt bath and treatment time period can vary. It is within the ability of one skilled in the art to determine the time and temperature according to the desired application. By way of a non-limiting example, the temperature of the molten salt bath may range from about 400° C. to about 800° C., such as from about 400° C. to about 500° C., and the predetermined time period may range from about 4 to about 24 hours, such as from about 4 hours to about 10 hours, although other temperature and time combinations are envisioned. By way of a non-limiting example, the glass can be submerged in a $KNO_3$ bath, for example, at about 450° C. for about 6 hours to obtain a K-enriched layer which imparts a surface compressive stress.

According to various embodiments, the glass substrate may have a compressive stress greater than about 100 MPa and a depth of layer of compressive stress (DOL) greater than about 10 microns. In further embodiments, the glass substrate may have a compressive stress greater than about 500 MPa and a DOL greater than about 20 microns, or a compressive stress greater than about 700 MPa and a DOL greater than about 40 microns.

In non-limiting embodiments, the glass substrate can have a thickness of less than or equal to about 3 mm, for example, ranging from about 0.1 mm to about 2 mm, from about 0.3 mm to about 1.5 mm, from about 0.5 mm to about 1.1 mm, or from about 0.7 mm to about 1 mm, including all ranges and subranges therebetween. According to various embodiments, the glass substrate can have a thickness of less than or equal to 0.3 mm, such as 0.2 mm, or 0.1 mm, including all ranges and subranges therebetween. In certain non-limiting embodiments, the glass substrate can have a thickness ranging from about 0.3 mm to about 1.5 mm, such as from about 0.5 to about 1 mm, including all ranges and subranges therebetween.

The glass substrate can have any shape and/or size suitable for use in a backlit display, such as an LCD. For example, the glass substrate can be a glass sheet in the shape of a rectangle, square, circle, or any other suitable shape. According to various embodiments, the glass substrate may be a four-sided glass sheet, such as a rectangle, having a length ranging, in various non-limiting embodiments, from about 0.3 mm to about 5 mm, such as from about 0.5 mm to about 3, or from about 1 mm to about 2 mm, including all ranges and subranges therebetween. The width of the glass substrate can range, for example, from about 0.3 mm to about 5 mm, such as from about 0.5 mm to about 3, or from about 1 mm to about 2 mm, including all ranges and subranges therebetween.

The glass substrate can, in various embodiments, be transparent or substantially transparent. As used herein, the term "transparent" is intended to denote that the glass substrate, at a thickness of approximately 1 mm, has a transmission of greater than about 80% in the visible region of the spectrum (420-700 nm). For instance, an exemplary transparent glass substrate may have greater than about 85% transmittance in the visible light range, such as greater than about 90%, or greater than about 95%, including all ranges and subranges therebetween. In certain embodiments, an exemplary glass substrate may have a transmittance of greater than about 50% in the ultraviolet (UV) region (200-410 nm), such as greater than about 55%, greater than about 60%, greater than about 65%, greater than about 70%, greater than about 75%, greater than about 80%, greater than about 85%, greater than about 90%, greater than about 95%, or greater than about 99% transmittance, including all ranges and subranges therebetween.

The glass substrate 110 can comprise a first surface 120 upon which the plurality of color-converting elements 140 can be disposed. As used herein, the terms "disposed," "disposed on," and variations thereof is intended to denote that the plurality of color-converting elements are deposited either directly on the first surface of the glass substrate or on an intermediate layer coated or otherwise present on the first surface of the glass substrate. Thus, for instance, the color-converting elements can be directly in contact with the glass substrate (as depicted in FIGS. 1A), in contact with an intermediate layer, such as a moldable material or dichroic layer (as depicted in FIGS. 1B-C and 2B-C), or interspersed within a material patterned on the glass substrate (as depicted in FIG. 2A).

In various embodiments, the glass substrate 110 can be patterned with a hydrophobic material 180 (see, e.g., FIG. 2A). As used herein, the term "patterned" is intended to denote that a material, e.g., a hydrophobic material, is coated or otherwise present on the first surface of the glass substrate in any given pattern or design, which may, for example, be random or arranged, repetitive or non-repetitive. For instance, the first surface of the glass substrate can be coated with a template, or grid, of material, that can define various "openings" of uncoated glass. These openings can be of any shape and/or size. According to various aspects, the openings can have a shape chosen from circles, squares, diamonds, triangles, hexagons, and other polygons, to name a few. Of course, the openings are not limited to the same shape and/or size, which can vary from opening to opening. In certain embodiments, the openings can have at least one dimension (e.g., radius, width, length, height, etc.) ranging from about 1 micron to about 5 mm, such as from about 10 microns to about 2 mm, from about 20 microns to about 1 mm, from about 50 microns to about 500 microns, or from about 100 microns to about 250 microns, including all ranges and subranges therebetween.

The at least one color-converting element 140 can thus be disposed on the first surface 120 of the glass substrate 110, for example, in areas corresponding to the openings formed by the pattern of hydrophobic material 180 (see, e.g., FIG. 2A). The hydrophobic material 180 can be chosen from any material less hydrophilic than the glass substrate 110. It should be understood that the hydrophobic material 180 need not be strongly hydrophobic and the glass substrate 110 be strongly hydrophilic. Rather, the uncoated glass substrate surface openings can be "philic" enough to allow a droplet to spread and cover the available surface, whereas the grid can be "phobic" enough to prevent further spreading of the droplet outside the opening and/or coalescing of the individual droplets from surrounding openings.

For example, the hydrophobic material 180 can be chosen from hydrophobic polymers, for instance, fluoropolymers such as polytetrafluoroethylene (PTFE), e.g., Teflon® from DuPont, fluorocarbons, and silicones. Such hydrophobic materials can be useful, for example, when depositing a mixture of color converters and an aqueous additional component, such as a water-based solution of color converters, as discussed in more detail below with respect to the disclosed methods. However, it is also noted that, in some embodiments, exemplary color-converting solutions can comprise a wide variety of solvents, both organic and inorganic, such as alcohols and hydrocarbons, e.g., pentane, cyclopentane, hexane, cyclohexane, benzene, toluene, chloroform, and dimethyl ether, to name a few. Thus, according to various embodiments, the first surface of the glass sheet can be patterned with any material that is more "phobic" to the chosen additional component, e.g., polymeric material or solvent, than the uncoated glass sheet. It is within the ability of one skilled in the art to select these materials based on the composition and properties of the color-converting mixture to be deposited on the substrate. In various embodiments, the hydrophobic material can be transparent, opaque, or absorbent (e.g., black).

The glass substrate 110 can, in non-limiting embodiments, comprise at least one groove 130 (or depression) on the first surface 120. Grooves can be created in the glass substrate itself, e.g., by processes such as photolithographic masking or etching, to name a few (see, e.g., FIG. 1A). Alternatively, grooves can be created on the first surface by depositing a moldable material thereon and forming grooves in the moldable material, e.g., by micro-replication (see, e.g., FIGS. 1B-C and 2B-C). The latter embodiment may be advantageous in various aspects because it can eliminate the need for photolithography and can enable roll-to-roll processing, thus enhancing the efficiency and/or reducing the cost of the manufacturing process. Suitable moldable materials include, for example, moldable polymers, such as plastics and UV-curable or thermally curable epoxies, resins, and photoresists. Non-limiting examples of moldable plastics include polycarbonate, polyethylene terephthalate (PET), and polyetherimide (PEI). According to various embodiments, the moldable material can be transparent.

The presence of grooves or depressions on the first surface can be used to define "islands" or discrete areas on which the color-converting elements can be placed or otherwise deposited. The side walls of the grooves or depressions can, in certain embodiments, be perpendicular to the first surface, e.g., forming a 90° angle with the surface. However, the grooves can also have walls at any angle relative to the first surface, e.g., less than or more than 90°, so long as a droplet is able to spread and cover the island without spilling over the edges of the island and into the grooves and/or coalescing with other individual droplets from surrounding islands.

The first surface can therefore comprise a "surface relief" or pattern on which the color-converting elements can be placed, either by way of a material, e.g., hydrophobic material, patterned on the first surface or by way of grooves or depressions etched or otherwise produced in or on the first surface. The pattern can define a plurality of "openings" or "islands" as discussed herein on which the color-converting elements can be placed or otherwise deposited. These opening or islands can be circular, but are not so limited and can have any suitable shape.

Figure 3A:
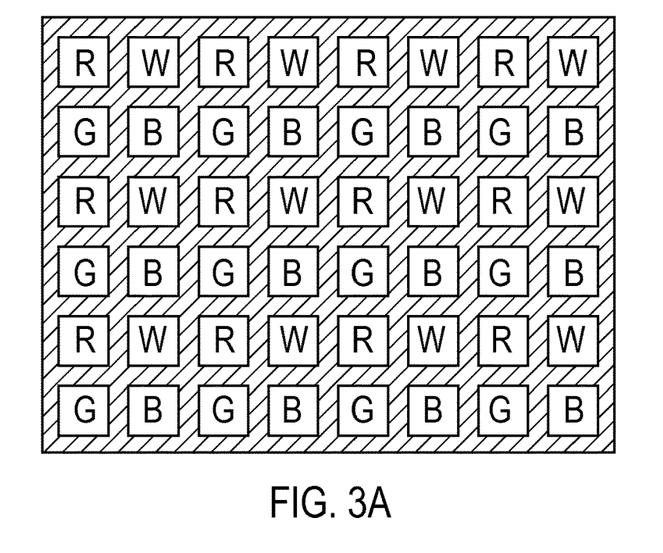
FIGS. 3A-B illustrate exemplary surface patterns for a light-emitting device according to embodiments of the disclosure.
Figure 3B:
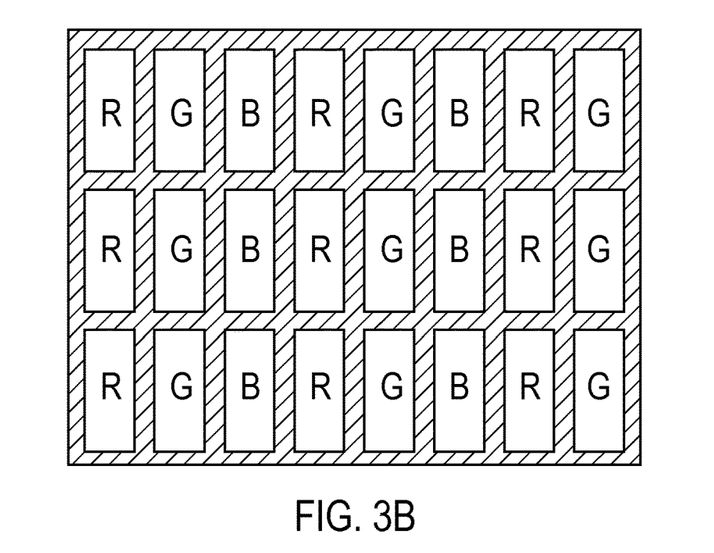

For instance, as depicted in FIGS. 3A-B, the first surface can comprise a grid with square (FIG. 3A) or rectangular (FIG. 3B) openings, although the depicted shapes should not be interpreted as limiting the appended claims. The openings can be filled with color-converting elements as appropriate to create a desired pixel pattern, e.g., color-converting elements comprising color converters emitting red (R), green (G), blue (B), or white (W) light. Alternatively, one or more openings in the grid can be empty, e.g., free of a color-converting element, and/or one or more of the openings can be supplied with light scattering features. For example, light scattering features can be created by texturing, etching, coating, damaging, or roughening one or more surfaces of the glass substrate, for instance, acid etching, coating with $TiO_2$, and/or laser damaging.

As previously disclosed, the color-converting element 140 can have any cross-sectional shape, e.g., a circle, square, rectangle, triangle, polygon, etc. so long as it comprises a convex surface. Of course, for non-circular cross-sections, the shape of the color-converting element (both as a droplet and after curing/drying) may not be perfectly hemispherical, but may have a generally hemispherical shape or generally convex surface arising from the respective non-circular cross-section due to surface tension forces. The contact angle of the convex surface with the glass surface can range, for example, from about 10° to about 90°, such as from about 20° to about 80°, from about 40° to about 70°, or from about 50° C. to about 60° C., including all ranges and subranges therebetween.

Figure 4A:
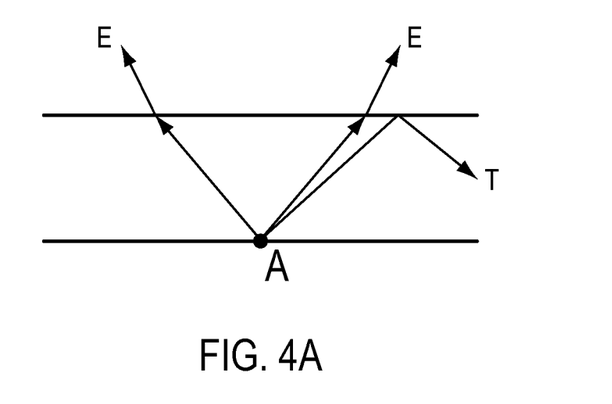
FIG. 4A is a graphical illustration of total internal reflection (TIR) for a color-converting element having a planar surface.
Figure 4B:
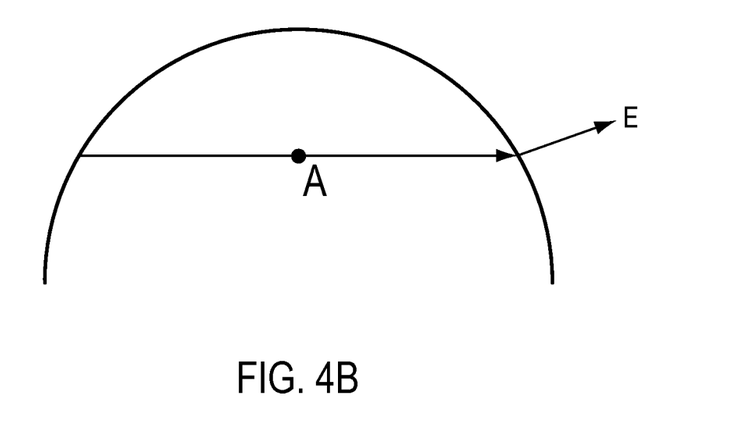
FIG. 4B is a graphical illustration of total internal reflection (TIR) for a color-converting element having a convex surface according to various embodiments of the present disclosure.

Referring to FIGS. 4A-B, which depict schematic illustrations of total internal reflection (TIR) for color-converting elements having a planar surface and a convex surface, respectively, it can be demonstrated that a color-converting element having a convex surface can increase the light extraction efficiency as compared to a color-converting film having a planar surface. For instance, for FIG. 4A, assuming that the refractive index of the color-converting element is 1.5, the critical angle, $\Theta_c$, can be calculated using Snell's law as 41.8°. Thus, for a flat outer surface, only a cone of rays E originating from point A having an angle of incidence less than about 42° can be emitted from the color-converting element. All other rays T may be trapped in the color-converting element due to TIR. Thus, the external quantum efficiency of the color-converting element having a planar surface can be limited to about 20%, even if the internal quantum efficiency of the element is close to about 100%.

However, for FIG. 4B, assuming the same refractive index and a contact angle of the depicted hemispherical-shaped droplet with the glass surface (not depicted) of 50°, rays E originating at point A with about +/−90° range of angles to the glass surface can be emitted by the color-converting element, because the angle of incidence at the convex surface may not exceed 40°. The increase in light extraction efficiency can be estimated using, e.g., ray-tracing optical modeling, but can be expected to be at least a factor of 1.5 greater, as compared to color-converting elements having flat surfaces, taking into account the corresponding increase in the external quantum efficiency as discussed herein.

The external quantum efficiency of the devices disclosed herein can, in some embodiments, be further enhanced, e.g., by employing a blue dichroic mirror. This layer is illustrated in FIGS. 1C and 2C as element 170. Blue dichroic layers can be used to reflect red and green light emitted downwards back towards the top surface, while still allowing blue light from the backlight to pass through. The blue dichroic layer can, in various embodiments, also reflect blue light back towards the top surface, in which case the blue light from the backlight can be a deeper blue that is still allowed to pass through the layer. According to various aspects of the disclosure, the dichroic layer can be a single layer or multi-layer coating, which can be deposited directly on the glass substrate or, in certain embodiments, on a moldable material coated on the glass substrate. The dichroic layer can be deposited on the glass substrate or moldable material before and/or after the surface is patterned, either by etching to form grooves or patterning with a hydrophobic material.

Further improvements in the external quantum efficiency can be achieved, e.g., by including concave indentations in the first surface (e.g., glass substrate or moldable material). These indentations are illustrated in FIGS. 2A-C as element 190. Thus, one or more of the openings or islands formed by the surface relief on the glass substrate can have a generally concave profile, as shown in FIGS. 2A-C, without limitation as to the degree of concavity. Because at least some reflection of light can happen at the boundary between the color-converting element and the first surface, particularly in embodiments in which a dichroic layer is used, a concave surface can further increases light extraction efficiency by decreasing the angle of incidence on the top surface for the rays reflected from the bottom. Concave surfaces can be formed, for example, by etching or by micro-replication, or any other suitable process.

The light-emitting devices disclosed herein can be used in a variety of display devices including, but not limited to, backlit displays such as LCDs, which can comprise various additional components. A backlight comprising one or more light sources may be used, for example, light-emitting diodes (LEDs) or cold cathode fluorescent lamps (CCFLs). According to various aspects of the disclosure, the display device may comprise at least one light source emitting blue light (UV light, approximately 200-410 nm), such as near-UV light (approximately 300-410 nm). The backlight can, for example, operate in twisted nematic (TN), vertical alignment (VA), or in-plane switching (IPS) mode. Available alternatives and variations with respect to the backlight will be understood by one skilled in the art and are intended to fall within the scope of the disclosure.

Figure 5:
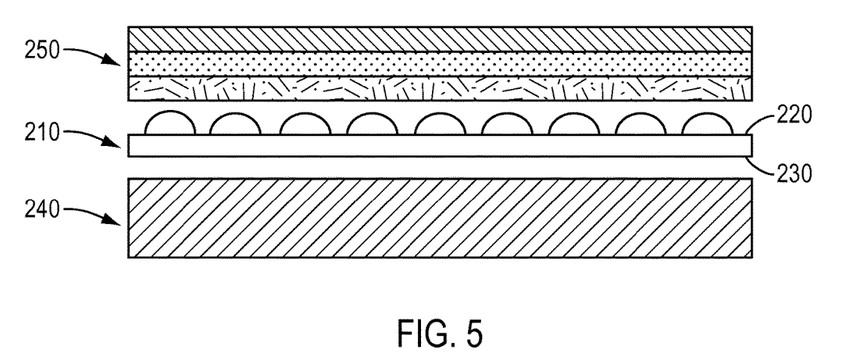
FIG. 5 illustrates optical components of an exemplary display device according to embodiments of the disclosure.

As depicted in FIG. 5, a light-emitting device according to the instant disclosure 210, having a first surface 220 and a second surface 230, can be placed in contact with, adjacent to, or otherwise in proximity to a backlight 240. Light from the backlight can thus enter the light-emitting device from the second surface 230 and be emitted from first surface 220 of the device. As such, the convex surfaces of the color-converting elements (which can be part of the first surface 220 of the device), can be referred to as "outer" or "emitting" surfaces, in the sense that these are surfaces from which light exits or is emitted from the device. The color-converting element can thus, in some embodiments, comprise convex outer surfaces or convex emitting surfaces. Light emitted from the device 210 can then enter the LCD stack 250, which can comprise various conventional components. For example, the LCD stack can comprise one or more reflecting or linear polarizers, a thin-film-transistor (TFT) array, a liquid crystal layer, a glass cover, and/or a UV blocking filter.

An exemplary TFT array may comprise active switching elements that permit voltage addressing of each sub-pixel of the display. A liquid crystal layer may comprise an electrooptic material, the structure of which can rotate upon application of an electric field, causing a polarization rotation of any light passing through it. In addition, a UV blocking filter can optionally be included on top of the light-emitting device to prevent excitation of the color converters by any UV light from outside of the display device. Furthermore, while FIG. 5 illustrates the light-emitting device 210 positioned between the backlight 240 and the LCD stack 250, it is also possible to place the light-emitting device on top of the LCD stack (e.g., the LCD stack is positioned between the backlight and the light-emitting device). In such embodiments, it may be advantageous to include a means for minimizing any potential haze in the reflected light, which might be caused by a strong relief of the first (e.g., outer) surface.

Methods

Disclosed herein are methods for making light-emitting devices, the methods comprising depositing on a first surface of a glass substrate a mixture comprising at least one color converter and at least one additional component, and curing or drying the mixture to produce at least one color-converting element having a convex surface.

The methods disclosed herein can be premised on the self-alignment of liquid materials driven, e.g., by surface tension. For example, considering the embodiment depicted in FIG. 2A, in which a glass substrate is patterned with a hydrophobic material, and assuming, for the sake of discussion, that the openings in the pattern are round-shaped, when a measured amount of mixture is delivered to one of the openings, the mixture can first spread to cover the circular "philic" opening. With increasing mixture amounts, a droplet with a gradually decreasing radius of curvature can be formed. As the droplet spreads to meet the surrounding "phobic" surface, the radius of curvature can begin to increase again. The contact angle can vary with additional amounts of mixture. The contact angle can reach about 90° when the droplet becomes a substantially perfect half-hemisphere with a minimum radius of curvature equal to the radius of the opening. The final shape of the droplet after curing and/or removing the solvent can vary depending on many factors, e.g., solution chemistry and/or surface geometry. Moreover, the final shape of the color-converting element can be "tuned" by altering the amount and/or type of mixture. Of course, it is to be understood that the above discussion can be applied equally to the other embodiments disclosed herein and depicted in FIGS. 1A-C and 2B-C.

According to various embodiments, the mixture can be a solution of at least one color converter dispersed or dissolved in at least one solvent. As used herein, the term "solution" and variations thereof is intended to denote a combination or mixture of at least one color converter with at least one solvent. The solution can, in certain embodiments, be a colloidal solution, e.g., comprising a dispersed phase (e.g., color converters) and a continuous phase (e.g., solvent). According to various aspects of the disclosure, the at least one solvent can be aqueous. Water-based solvents may be advantageous for forming droplets with a high radius of curvature, e.g., substantially hemi-spherical droplets, due to the high surface tension of water. However, the solvents disclosed herein are not limited to water-based solutions and can be chosen, for example, from any inorganic or organic material that can be combined with at least one color converter, delivered in liquid form, and subsequently treated, e.g., cured or dried, to produce a color-converting element. As used herein, the term "liquid" is intended to refer to any free-flowing medium having any viscosity suitable for deposition onto the glass substrate.

According to the methods disclosed herein, the mixture can be deposited or placed on or otherwise added to the first surface of the glass substrate using any means known in the art. As used herein, the term "deposited on the first surface" and variations thereof is intended to denote that the mixture is placed either directly on the first surface of the glass substrate or on an intermediate layer coated or otherwise present on the first surface of the glass substrate. For instance, the mixture can be added to the first surface drop-wise, until a droplet having the desired shape and size is formed. In other embodiments, a measured amount of mixture can be deposited on the first surface to form a droplet having a predetermined shape and size. Of course, one or more droplets can be formed and/or deposited at the same time, for instance, according to a predetermined template, e.g., using a machine or other suitable device. Techniques and devices developed for ink-jet printing may be used to deposit the droplets, as well as other micro-fluidic approaches and devices, such as contact printing.

Advantageously, the methods disclosed may be carried out without the need for high precision machinery due to the self-aligning properties of the solution or mixture. For example, even if a droplet falls off-center, it can still spread to fill the opening or island. According to certain aspects, a degree of precision may be employed to measure the amount of mixture deposited on each individual opening or island to avoid delivering too much of the mixture (possibly resulting in spillage and/or coalescence of individual droplets) or delivering too little of the mixture (possibly resulting in a color-converting element without a convex surface).

After deposition, the droplets can be treated to form color-converting elements. These treatments can vary by type and duration depending, for example, on the type and amount of mixture deposited on the glass substrate. In some embodiments, the droplets of mixture can be cured, e.g., using thermal curing or photo-curing, to substantially solidify the droplet. For instance, the mixture can comprise at least one additional component that can be cross-linked or hardened after thermal or photo-curing such as UV-curable or thermally curable resins. In additional embodiments, the at least one additional component can be a solvent. The droplets of mixture can thus be dried, e.g., by heating, to evaporate all or a portion of the solvent. Combinations of treatments can also be employed, such as drying followed by curing, or simultaneous drying and curing, and variations thereof.

According to various non-limiting embodiments, the color-converting element can comprise at least one color converter, which can, e.g., be encapsulated or otherwise contained within the element after drying or curing. Suitable color converters can include quantum dots, phosphors, fluorescent materials, fluorescent dyes, light-emitting polymers, and combinations thereof. Quantum dots and phosphors can, in some embodiments, emit white, red, green, or blue light. According to one non-limiting embodiments, an yttrium aluminum garnet (YAG) phosphor can be used. In other embodiments, the color-converting element can comprise a fluorescent dye such as coumarin and rhodamine. Suitable light-emitting polymers can include, for example, poly(1,4-phenylene vinylene) (PPV), poly(1,4-phenylene) (PPP), polyfluorenes (PFO), and poly(thiophenes), to name a few. The color-converting element can, in certain embodiments, further comprise various optional components other than the color converter or solvent, such as photoinitiators, e.g., serving as a curing aid, or non-optically active polymers, e.g., serving as a matrix for the color converters.

The methods disclosed herein can further comprise steps of preparing the glass substrate, e.g., patterning the substrate with a material, such as a hydrophobic material, coating the substrate with a moldable material, etching or otherwise treating the glass substrate or moldable material to create at least one groove or concave indentation, and applying a dichroic layer, as discussed above. Additional optional steps conventionally employed in the manufacture of a light-emitting device can also be used, according to methods known in the art.

According to various embodiments, the methods disclosed herein can comprise only one photolithographic step (e.g., forming the grid pattern or surface relief on the first surface). Once the desired template or grid is formed, red, green, blue, and/or white color converters and/or light scattering features can be deposited on the first surface, e.g., as "inks," using less costly and/or simpler printing methods. Of course, methods employing more than one lithographic step are possible and contemplated as falling within the scope of the disclosure.

Displays comprising the light-emitting devices disclosed herein can have various advantages over conventional displays, such as higher power efficiency due to elimination of color filters and the light loss associated therewith. In various embodiments, devices comprising color-converting elements employing quantum dots may exhibit a wider color gamut, higher color purity, and/or lower cost as compared to conventional display comprising traditional phosphor color converters. Finally, light-emitting devices manufactured according to the methods disclosed herein, as well as display devices comprising them, can have lower overall cost and/or production time due to less expensive and/or less complex manufacturing processes. Of course, the devices and methods disclosed herein may not have one or all of the above-disclosed advantages but are still intended to fall within the scope of the appended claims.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "a color-converting element" includes examples having two or more such elements unless the context clearly indicates otherwise. Likewise, a "plurality" or an "array" is intended to denote "more than one." As such, a "plurality" or "array" of color-converting elements includes two or more such elements, such as three or more such elements, etc.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a device that comprises A+B+C include embodiments where a device consists of A+B+C and embodiments where a device consists essentially of A+B+C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A display device comprising:
    a light-emitting device comprising:
        a glass substrate having a first surface; and
        a plurality of color-converting elements disposed on the first surface of the glass substrate,
        wherein at least one of the plurality of color-converting elements comprises a convex surface; and
        wherein the plurality of color-converting elements comprises at least one of red, green, blue, or white light-emitting quantum dots or phosphors, fluorescent materials, fluorescent dyes, or light-emitting polymers.

2. The device of claim 1, wherein a hydrophobic material is coated on the first surface in a pattern defining a plurality of openings on the first surface.

3. The device of claim 2, wherein the plurality of color-converting elements are disposed in the plurality of openings on the first surface.

4. The device of claim 1, wherein the first surface is etched or masked or is coated with a moldable material and comprises at least one groove defining a plurality of islands on the first surface.

5. The device of claim 4, wherein the plurality of color-converting elements are disposed on the plurality of islands on the first surface.

6. The device of claim 1, wherein the first surface comprises a plurality of concave indentations corresponding to the locations of the plurality of color-converting elements.

7. The device of claim 1, further comprising a dichroic layer.

8. The device of claim 1, further comprising at least one of a reflecting polarizer, linear polarizer, TFT array, liquid crystal layer, glass cover, or UV blocking filter.

9. A method for making a light-emitting device, the method comprising:
    (a) producing at least one groove defining a plurality of islands on a first surface of a glass substrate by:
        (i) etching or masking the first surface to produce the at least one groove, or
        (ii) coating the first surface with a moldable material comprising the at least one groove;
    (b) depositing a mixture comprising at least one color converter and at least one additional component on at least one of the plurality of islands on the first surface; and
    (c) curing or drying the mixture to produce at least one color-converting element having a convex surface.

10. The method of claim 9, wherein the at least one color converter is chosen from red, green, blue, or white light-emitting quantum dots and phosphors, fluorescent materials, fluorescent dyes, light-emitting polymers, and mixtures thereof.

11. The method of claim 9, wherein the at least one additional component is a polymeric material, a solvent, or a combination thereof.

12. The method of claim 11, wherein curing or drying the mixture comprises thermally curing or photo-curing the polymeric material, or drying the mixture to remove at least a portion of the solvent.

13. A method for making a light-emitting device, the method comprising:
    (a) coating a first surface of a glass substrate with a hydrophobic material in a pattern defining a plurality of openings on the first surface;
    (b) depositing a mixture comprising at least one color converter and at least one additional component on at least one of the plurality of openings on the first surface; and
    (c) curing or drying the mixture to produce at least one color-converting element having a convex surface.

14. The method of claim 13, wherein the mixture is a solution comprising the at least one color converter and at least one solvent.

15. A light-emitting device comprising:
    a glass substrate having a first surface;
    a hydrophobic material coated on the first surface in a pattern defining a plurality of openings on the first surface;
    a plurality of color-converting elements disposed in the plurality of openings on the first surface of the glass substrate,
    wherein at least one of the plurality of color-converting elements comprises a convex surface; and
    wherein the plurality of color-converting elements comprises at least one of red, green, blue, or white light-emitting quantum dots or phosphors, or light-emitting polymers.

16. A light-emitting device comprising:
    a glass substrate having a first surface comprising at least one groove defining a plurality of islands on the first surface, wherein the at least one groove is etched or masked on the first surface or defined by a moldable material coated on the first surface;
    a plurality of color-converting elements disposed on the plurality of islands on the first surface of the glass substrate,
    wherein at least one of the plurality of color-converting elements comprises a convex surface; and
    wherein the plurality of color-converting elements comprises at least one of red, green, blue, or white light-emitting quantum dots or phosphors, fluorescent materials, fluorescent dyes, or light-emitting polymers.

17. A light-emitting device comprising:
    a glass substrate having a first planar surface; and
    a plurality of color-converting elements disposed on the first planar surface of the glass substrate,
    wherein at least one of the plurality of color-converting elements comprises a convex surface; and
    wherein the plurality of color-converting elements comprises at least one of red, green, blue, or white light-emitting quantum dots or phosphors, or light-emitting polymers.

* * * * *